June 24, 1941.                J. BABIN                2,246,710
                           WHEEL MOUNTING
                        Filed April 3, 1940          2 Sheets-Sheet 2
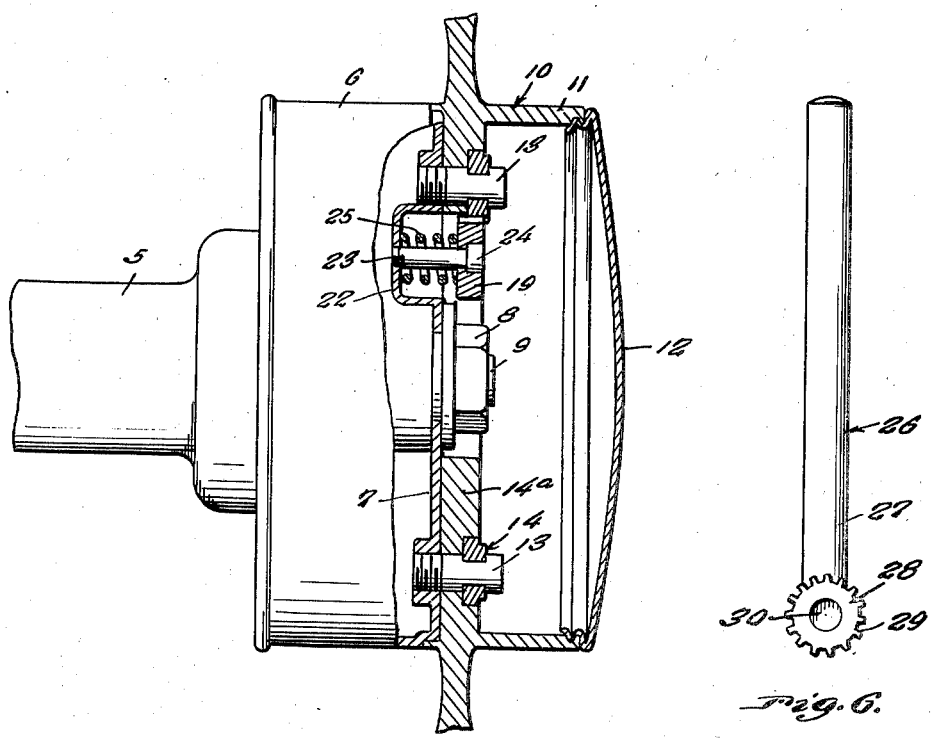
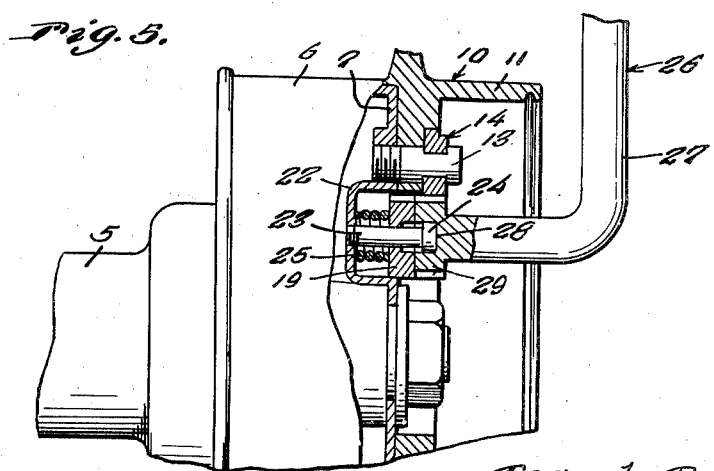
Inventor
Joseph Babin
By Clarence A O'Brien
                                               Attorney Patented June 24, 1941

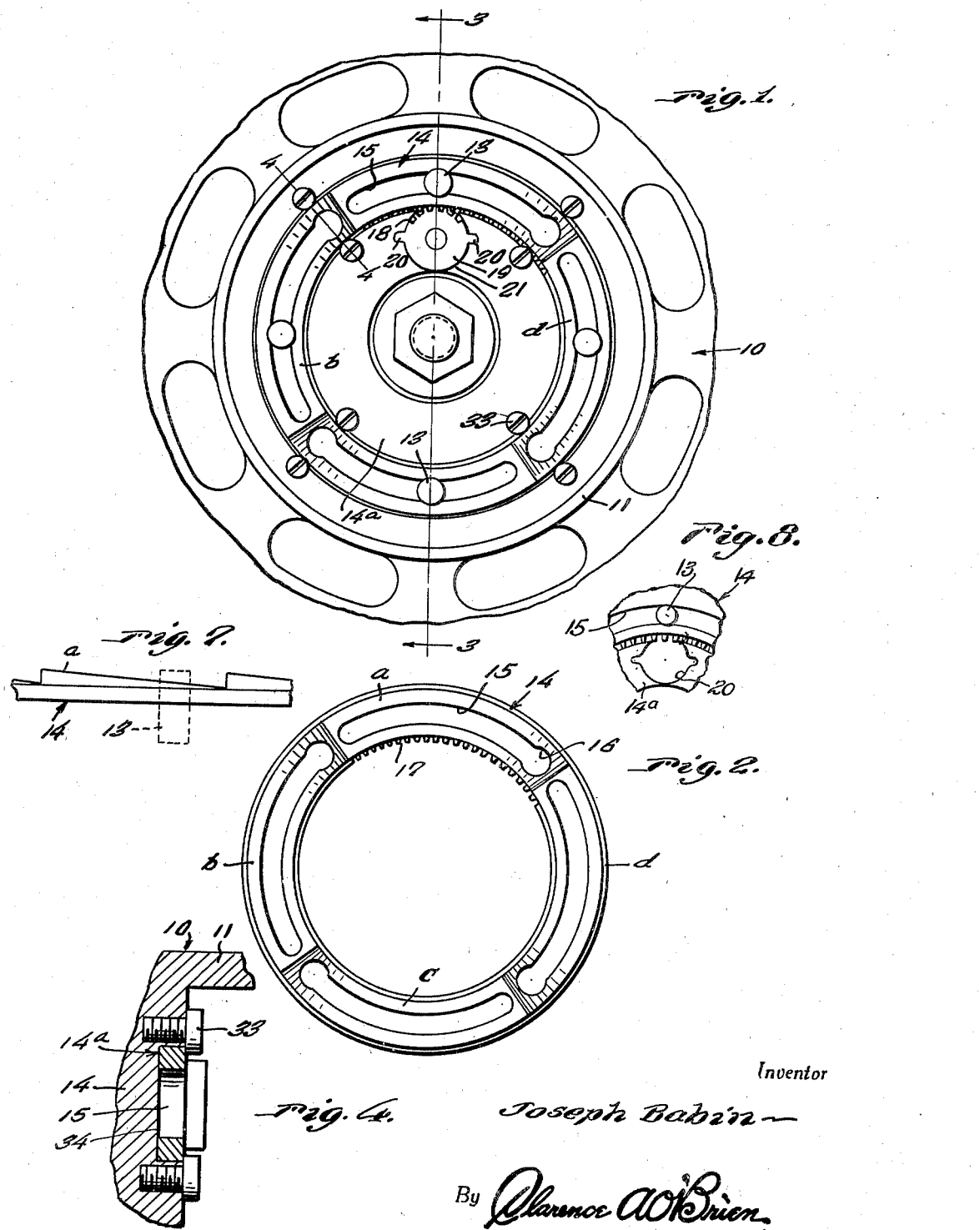

2,246,710

UNITED STATES PATENT OFFICE 2,246,710

WHEEL MOUNTING

Joseph Babin, Paulina, La., assignor of one-third to Sigur Martin, Lutcher, La.

Application April 3, 1940, Serial No. 327,710

1 Claim. (Cl. 301—9)

This invention appertains to new and useful improvements in wheel assemblies and more particularly to a wheel assembly of the quick detachable type.

The principal object of the present invention is to provide a wheel assembly which will permit the removal of the wheel proper without removing a number of nuts.

Another important object of the invention is to provide a wheel assembly which will require a minimum number of operations and the least amount of effort on the part of the operator.

Other objects and advantages of the invention will become apparent to the reader of the following specification.

In the drawings:

Figure 1 represents a fragmentary outside elevational view of the wheel with the cap removed.

Figure 2 is an elevational view of the wedge ring.

Figure 3 is a fragmentary sectional view on the line 3—3 of Figure 1.

Figure 4 is a fragmentary detailed enlarged sectional view on a line 4—4 of Figure 1.

Figure 5 is a fragmentary vertical sectional view taken also substantially on a line 3—3 of Figure 1, but showing the large pinion in disengaged position.

Figure 6 is a side elevational view of the pinion removing tool.

Figure 7 is a fragmentary edge elevational view of the wedge ring.

Figure 8 is a fragmentary elevational view with parts removed.

Referring to the drawings, wherein like numerals designate like parts, it can be seen that numeral 5 denotes the usual axle, while numeral 6 denotes the wheel hub. The hub 6 has the outer wall 7 through which the axle shaft extends, a nut 8 being employed on the threaded end 9 of the axle shaft to secure the hub 6 and shaft positively together.

Numeral 10 generally refers to the wheel proper which has the annular wall 11 at its central portion defining a protective box for the wheel attaching means. The hub cap 12 is attachable to this wall 11 as suggested in Figure 3.

Stud members 13 project from the wall 7, their inner ends preferably being threaded into the wall 7. These studs 13 extend through openings in the central portion 14 of the wheel unit 10. Opposite side portions of each of these studs 13 are notched to receive the edge portion of the ring generally referred to by numeral 14 at the edge portions of the corresponding slots 15.

As shown in Figures 1 and 2, the ring 14 is formed with a plurality of slots 15 each at one end merging into a substantially large opening 16 sufficiently large in diameter to permit the passage therethrough of a stud 13. It is preferable that the ring be divided into the inclined portions A, B, C and D. At the side at which the wedge portion A is located, gear teeth 17 are provided at the inner side of the ring and these are to be engaged by the teeth 18 on the slide pinion 19, this slide pinion 19 having lateral ribs 20 slidable in slots in the side wall of an opening 21 which extends through the wall 14 and is aligned with the pocket formation 22 in the wall 7 of the hub 6.

Projecting outwardly from the back wall of the pocket 22 is the pin 23 which has the head 24 on its outer end. The pinion 19 is slidable on the pin 23 and prevented from coming off by the head 24.

The pinion is movable inwardly, into the pocket 23 against the tension of the compression spring 25 on the pin 23.

As suggested in Figure 1, the tool generally referred to by numeral 26 is employable for moving the pinion.

The tool 26 consists of the handle 27 having the head 28 formed with gear teeth 29. This head has the recess 30 for receiving the head 24.

The head 28 is slipped over the head 24 and the head forced inwardly so that the teeth of the pinion 19 are removed from the teeth 17 of the ring 14 while the teeth 29 of the tool 26 engage the teeth 17.

With the studs 13 projecting through the opening 16 in the ring 14, rotation of the tool will rotate the ring to the end that the ring is driven into binding relation with the studs 13, the ring binding against the studs at the notches therein. As shown in Figure 4, headed screws 33 are driven into the wall 14 and partly overlap the ring 14a to define a guide for the ring in conjunction with the groove or channel 34 in which the ring is rotatable.

While the foregoing specification sets forth the invention in specific terms, it is to be understood that numerous changes in the shape, size and materials may be resorted to without departing from the spirit and scope of the invention as claimed hereinafter.

Having thus described the invention, what is claimed as new is—

In combination a wheel, an axle plate, cam formations on the wheel, projections on the axle plate adapted to bind against the cam formations, said axle plate being provided with a pocket having a guide groove in a side wall thereof, a toothed slide member mounted in the pocket and having a rib adapted to ride in the guide slot to prevent rotation thereof, spring means exerting force on the toothed slide member, said cam formations being in the form of an annulus, teeth on the inner edge portion of the annulus adapted to be meshed by the teeth of the slide member when the latter is under the influence of the spring means, said toothed slide member being yieldable to a tool capable of rotating the cam annulus.

JOSEPH BABIN.